(12) United States Patent
Karlov et al.

(10) Patent No.: US 7,450,121 B2
(45) Date of Patent: Nov. 11, 2008

(54) DYNAMIC BIT DEPTH RENDERING

(75) Inventors: David Karlov, Blaxland East (AU); Paul Frederick Birchall, Oatlands (AU)

(73) Assignee: Canon Kabushiki Kaisha, Tokyo (JP)

( * ) Notice: Subject to any disclaimer, the term of this patent is extended or adjusted under 35 U.S.C. 154(b) by 156 days.

(21) Appl. No.: 11/249,467

(22) Filed: Oct. 14, 2005

(65) Prior Publication Data
US 2006/0082596 A1 Apr. 20, 2006

(30) Foreign Application Priority Data

Oct. 19, 2004 (AU) .............................. 2004906055

(51) Int. Cl.
*G06T 15/00* (2006.01)
(52) U.S. Cl. ...................... 345/422; 345/427; 345/629; 358/3.2
(58) Field of Classification Search ................. 345/422, 345/427, 629; 358/3.2
See application file for complete search history.

(56) References Cited

U.S. PATENT DOCUMENTS

| 5,295,000 | A | 3/1994 | Nonoshita et al. ........... 358/444 |
| 5,521,990 | A | 5/1996 | Ishizawa et al. ............. 382/270 |
| 5,659,407 | A | 8/1997 | Andresen et al. ............ 358/530 |
| 6,327,043 | B1 | 12/2001 | Rumph et al. .............. 358/1.15 |
| 7,218,420 | B1 * | 5/2007 | Tai et al. ...................... 358/3.2 |
| 2003/0118250 | A1 | 6/2003 | Tlaskal et al. ............... 382/284 |

OTHER PUBLICATIONS

T. Porter, et al., "Compositing Digital Images", Computer Graphics, vol. 18, No. 3, pp. 253-259 (Jul. 1984).

* cited by examiner

*Primary Examiner*—Phu K Nguyen
(74) *Attorney, Agent, or Firm*—Fitzpatrick, Cella, Harper & Scinto

(57) ABSTRACT

A method is described of compositing a plurality of graphical objects to create an image comprising a plurality of parts, where the parts may be a run of pixels along a scanline or a region of the image. For each part of the image to be composited, the method identifies a set of the graphical objects that contribute to the part, and determines one or more required bit depths for compositing the set. The set is composited within the part at the one or more required bit depths. Thus selected parts of the image may be generated using a higher compositing bit depth.

23 Claims, 9 Drawing Sheets

DYNAMIC BIT DEPTH RENDERING

CROSS-REFERENCE TO RELATED PATENT APPLICATIONS

This application claims the right of priority under 35 U.S.C. § 119 based on Australian Patent Application No 2004906055, filed 19 Oct. 2004, which is incorporated by reference herein in its entirety as if fully set forth herein.

FIELD OF THE INVENTION

The present invention relates to the creation of computer-generated images, and in particular, to generating selected regions of an image using a higher compositing bit depth.

BACKGROUND

Computer generated images are typically made up of many different components or graphical elements which are rendered and composited together to create a final image. The compositing may be performed by special-purpose hardware, or by software running on a general or special-purpose computer system, such as a microprocessor inside a printer.

The bit depth at which compositing is performed limits the accuracy, or quality, of the final image. A bit depth of 8 bits per channel is commonly used in current renderers. For a renderer working in an RGBA color space, a bit depth of 8 implies that each channel (R, G, B, and A) of each pixel is limited to 256 discrete levels. When the pixel result of a compositing operation lies somewhere between two representable levels, the result is rounded to one level or the other.

In order to achieve greater accuracy of color data, some renderers have been designed to work at a higher bit depth, such as 16. However, 16 bit renderers are necessarily substantially slower than an 8 bit renderer. In a color space such as RGBA, compositing in bit depths greater than 8 provides only limited advantages over a bit depth of 8, especially if most or all objects to be rendered are initially represented in a bit depth of 8. In these cases, for a large part of typical images to be rendered, there is no advantage at all in higher bit depth rendering, and for the part where there is an advantage, the advantage is small. For this reason, the small advantage of increased accuracy is usually avoided in favor of maintaining the speed of the renderer.

Graphical content differs from image to image, and some images to be rendered may gain no benefit whatsoever from using a higher bit depth. One prior art approach examines the objects to be rendered, and renders the image in greyscale (that is, a single channel color space) if all objects to be rendered are greyscale, and in color (for example a three-channel color space such as RGB) if any objects to be rendered are not greyscale. This is effectively using triple the bit depth to render the image when the image contains any color. The disadvantage of this approach is its inflexibility. For an image which contains even a single pixel in color, where the rest of the page is black and white text, the whole page will be rendered using color compositing. Such color compositing is much slower than the greyscale compositing which would be performed if that single color pixel were absent.

A further prior art approach to compositing divides the image space into regions, and modifies the compositing expression for each region depending on the contributing objects, in order to optimize compositing. However, this approach does not teach methods of improving the quality of the composited image.

SUMMARY

It is an object of the present invention to substantially overcome, or at least ameliorate, one or more disadvantages of existing arrangements.

Arrangements are disclosed capable of selectively compositing parts of an image in a higher bit depth.

According to a first aspect of the present disclosure, there is provided a method of compositing a plurality of graphical objects to create an image comprising a plurality of parts, said method comprising the steps of, for each part of the image to be composited:

identifying a set of the graphical objects that contribute to the part;

determining one or more required bit depths for compositing the set; and compositing the set within the part at the one or more required bit depths.

According to a second aspect of the present disclosure, there is provided an apparatus for compositing a plurality of graphical objects to create an image comprising a plurality of parts, said apparatus comprising:

means for identifying, for each part of the image to be composited, a set of the graphical objects that contribute to the part;

means for determining, for each part of the image to be composited, one or more required bit depths for compositing the set; and means for compositing the set within the part at the one or more required bit depths.

According to a further aspect of the present disclosure, there is provided a system for compositing a plurality of graphical objects to create an image comprising a plurality of parts, said system comprising:

data storage for storing the plurality of graphical objects;

a renderer in communication with the data storage and adapted to:

identify, for each part of the image to be composited, a set of the graphical objects that contribute to the part;

determine, for each part of the image to be composited, one or more required bit depths for compositing the set; and composite the set within the part at the one or more required bit depths.

According to a further aspect of the present disclosure, there is provided a computer program product comprising machine-readable program code recorded on a machine-readable recording medium, for controlling the operation of a data processing apparatus on which the program code executes to perform a method of compositing a plurality of graphical objects to create an image comprising a plurality of parts, said method comprising the steps of, for each part of the image to be composited:

identifying a set of the graphical objects that contribute to the part;

determining one or more required bit depths for compositing the set; and compositing the set within the part at the one or more required bit depths.

According to a further aspect of the present disclosure, there is provided a computer program comprising machine-readable program code for controlling the operation of a data processing apparatus on which the program code executes to perform a method of compositing a plurality of graphical objects to create an image comprising a plurality of parts, said method comprising the steps of, for each part of the image to be composited:

identifying a set of the graphical objects that contribute to the part;

determining one or more required bit depths for compositing the set; and compositing the set within the part at the one or more required bit depths.

BRIEF DESCRIPTION OF THE DRAWINGS

One or more embodiments of the present invention will now be described with reference to the drawings, in which.

DETAILED DESCRIPTION INCLUDING BEST MODE

The present disclosure relates to methods of rendering graphical objects where the bit depth is determined dynamically such that different parts of an image may be rendered at different bit depths. For brevity, where a number of bits per channel is expressed, the following description may refer to "8 bits" (for example), rather than "8 bits per channel".

1.0 Rendering Apparatus

Figure 7:
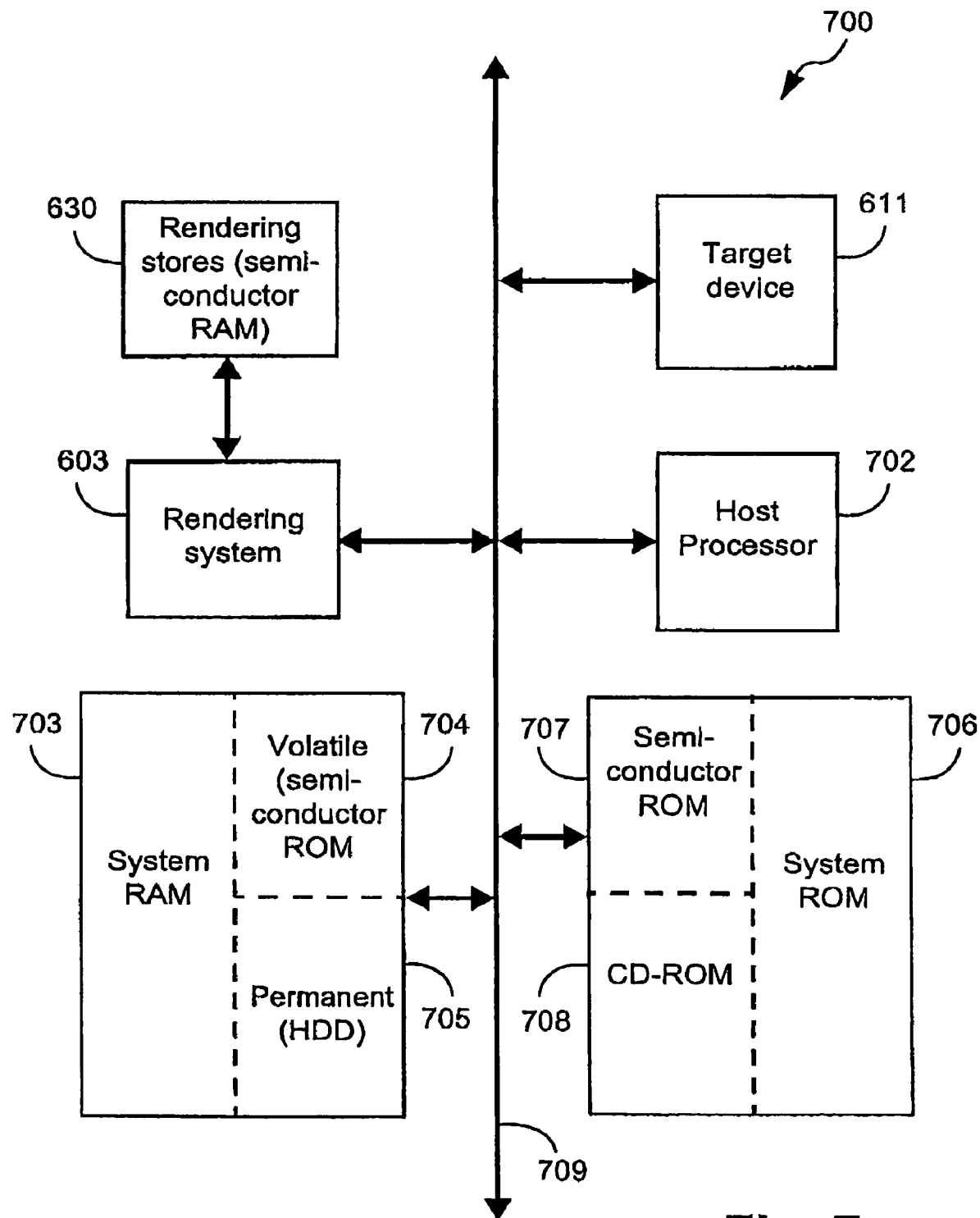
FIG. 7 is a schematic block diagram representation of a computer system incorporating a rendering arrangement.

FIG. 7 illustrates schematically a system 700 configured for rendering and presenting computer graphic object images. Such a system may be used to implement the methods of the present disclosure. The system 700 includes a host processor 702 associated with system random access memory (RAM) 703, which may include a non-volatile hard disk drive or similar device 705 and volatile, semiconductor RAM 704. The system 700 also includes a system read-only memory (ROM) 706 typically founded upon semiconductor ROM 707 and which may be supplemented by compact disk devices (CD ROM) 708.

The system 700 may also incorporate a target device 611 for displaying images, such as a printer or video display unit (VDU) which operates in raster fashion.

The above-described components of the system 700 are interconnected via a bus system 709 and are operable in a normal operating mode of computer systems well known in the art, such as IBM PC/AT type personal computers and arrangements evolved therefrom.

Also seen in FIG. 7, a graphic rendering system 603 (or renderer) connects to the bus 709, and is configured for the rendering of pixel-based images derived from graphic object-based descriptions supplied with instructions and data from the processor 702 via the bus 709. The renderer 603 may utilize the system RAM 703 for the rendering of object descriptions although preferably the renderer 603 may have associated therewith a dedicated rendering store arrangement 630, typically formed of semiconductor RAM.

The rendering system 603 may be implemented as software on the host processor 702. Alternatively, the rendering system 603 may be implemented on a separate unit, which may be a custom-built hardware unit or which may be software running on a general-purpose computer. In a further alternative, the rendering system may be an embedded system on the target device 611.

Figure 6:
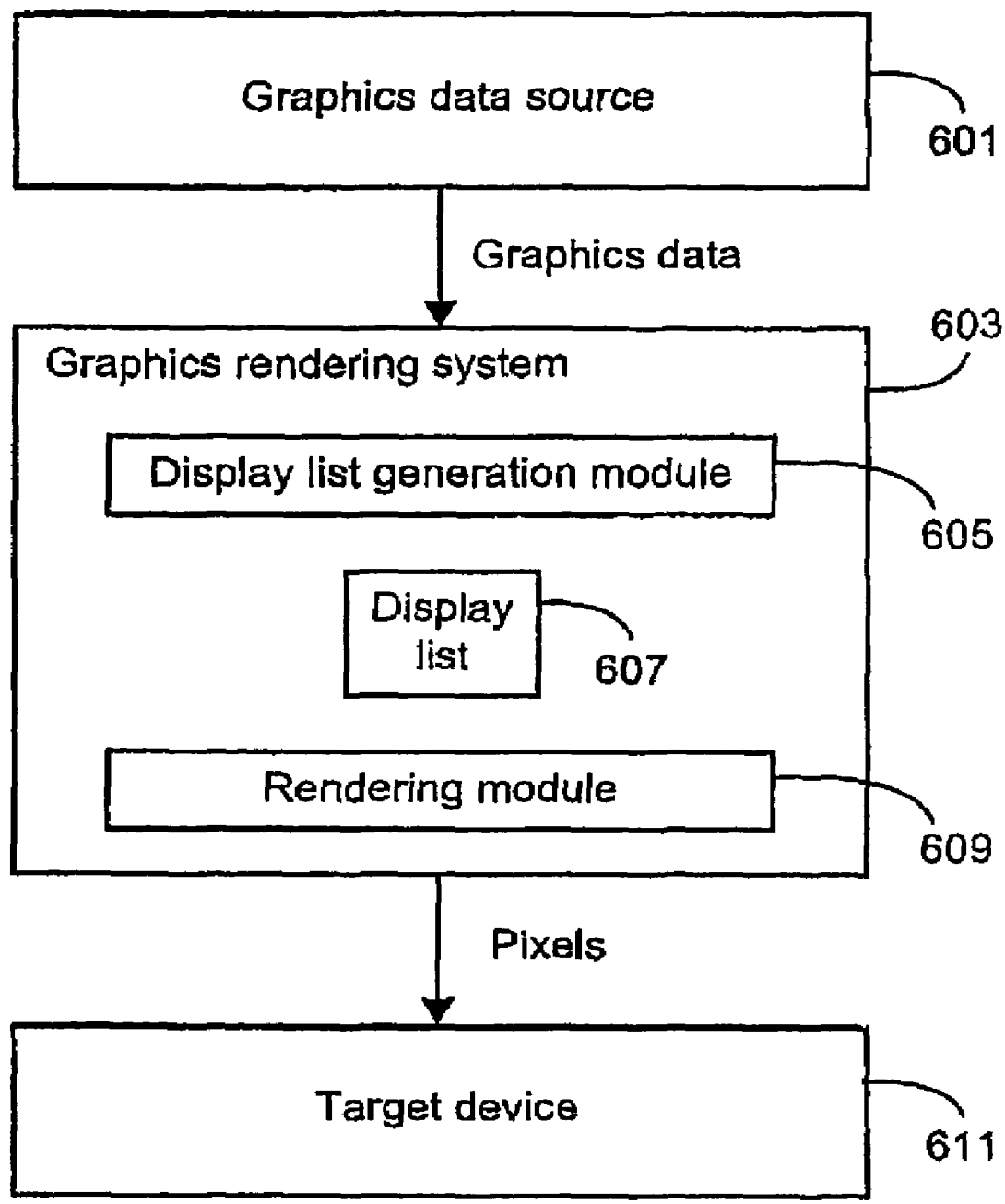
FIG. 6 is a schematic block diagram of a render pipeline in which the rendering arrangements of the present disclosure may be implemented.

A rendering pipeline is illustrated in FIG. 6. A graphics data source 601, such as a PDL (page description language) interpreter or GDI (graphics device interface) driver, running on the host processor 702, sends graphics data to the graphics rendering system 603, which has a display list generation module 605 and a rendering module 609.

The display list generation module 605 generates a display list from a set of objects defined in the data received from the graphics data source 601. Objects in the display list are ordered in z-level (priority) order from a lowest-priority object to a highest priority object. The display list is stored in the display list store 607. The rendering module 609 processes the display list, generating pixels for printing.

In the case that the renderer 603 is resident as software on the host processor 702, the renderer 603 generates a bitmap, which may be halftoned. The bit depth of this bitmap is called the output bit depth. The bitmap is compressed and sent to the target device 611, which decompresses the bitmap and renders the page of pixel data.

In an alternative configuration the display list generation module 605 resides on the host processor 702 and the rendering module 609 is embedded in the target device 611. In this case the host processor 702 sends the display list to the target device 611, which renders the display list and generates pixel data for printing.

The rendering module 609 may use any rendering method in which compositing is performed. In a first arrangement a pixel sequential rendering method is used, as described in more detail below.

Note that where the word "image" or "output image" is used in the present disclosure, there is no implication that the image must be directly viewable. An image may, for example, be stored in memory for future display.

2.0 Data Structures

As the display list generation module 605 receives an object from a graphics data source 601, module 605 decomposes the object into three components:

edges, describing the outline of the object;

drawing information, describing how the object is drawn on the page; and fill information, describing the color of the object.

Outlines of objects are broken into up edges and down edges, where each edge proceeds monotonically down the page. An edge is assigned the direction 'up' or 'down' depending on whether the edge activates or deactivates the object when scanned along a scanline.

Edges are implemented in software as a data structure. The data structure contains:
  points describing the outline of the edge;
  the x position of the edge on the current scanline; and
  edge direction.

Drawing information, or level data, is stored in a level data structure. The data structure typically contains:
  a z-order integer, called the priority;
  a fill-rule, such as odd-even or non-zero-winding;
  information about the object (such as whether the object is a text object, graphic object or image object);
  a compositing operator;
  the type of fill being drawn, such as a bitmap, tile, flat color, or linear gradient; and
  a clip-count, indicating how many clips are clipping this object.

Fill information, or fill data, is stored in a data structure called a fill data structure.

The contents of the data structure depend on the fill type. For a bitmap fill, the data structure typically contains:
  x and y location of the bitmap origin on the page;
  width and height of the bitmap in pixels;
  a page-to-image transformation matrix;
  a value indicating the format of the image data, (for example 32 bpp RGBA, or 24 bpp BGR, etc. . . . );
  a flag indicating whether the bitmap requires interpolation; and
  a pointer to the image data.

For a flat fill, the data structure typically contains integers of 8 bits or 16 bits for each channel the color contains (for example red, green, blue, and alpha).

For a gradient fill, the data structure typically contains:
  two or three colors, each having an integer of 8 bits or 16 bits for each channel the color contains; and
  two or three geometrical points, each associated with one of the two or three colors, and each point having an x position and a y position.

Each edge data structure generally has a pointer to a level data structure. Each level data structure also has pointers to one or more fill data structures, depending on the compositing operator.

Figure 5A:
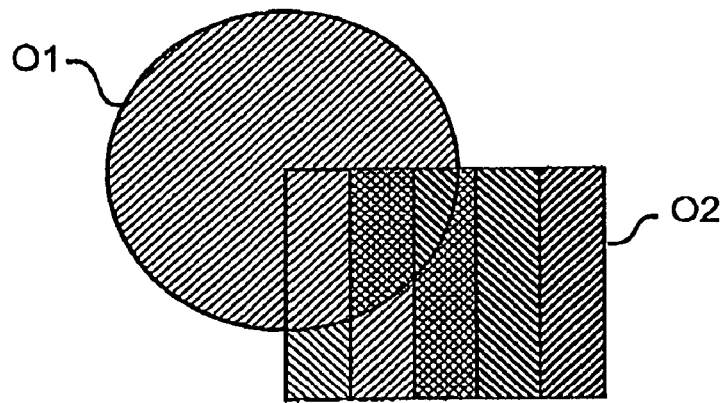
FIG. 5A shows an example of two objects to be rendered, wherein a semi-transparent rectangular gradient is drawn over an opaque circle.

FIG. 5A shows an image having a first object O1 that is an opaque yellow circle, and a second object O2 over the first object. Object O2 is a rectangular semi-transparent blue gradient, ramping left to right from light blue to dark blue.

Figure 5B:
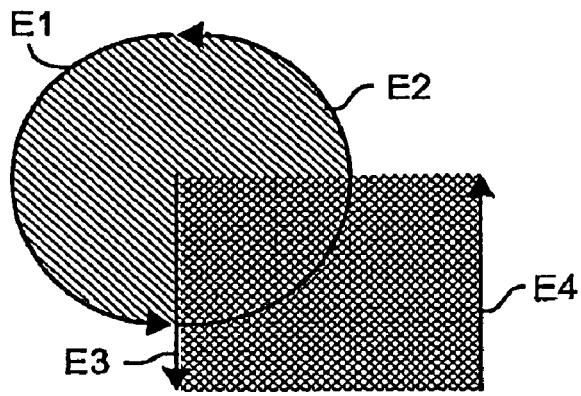
FIG. 5B shows the edges for the objects of FIG. 5A.

FIG. 5B shows the edges of objects O1 and O2. Object O1 has—
  edges=E1 (down), E2 (up);
  level data={fill-rule=non-zero-winding, object-type=graphic, priority=1}; and
  fill data=8 bit RGBA=255, 255, 0, 255 (opaque yellow).
Object O2 has—
  edges=E3 (down), E4 (up);
  level data={fill-rule=non-zero-winding, object-type=graphic, priority=2}; and
  fill data={color 1=8 bit RGBA=128, 128, 255, 128 (semi-transparent light blue) with point 1=x, y coordinates of the top left corner of the rectangle, color 2=8 bit RGBA=0, 0, 128, 128 (semi-transparent dark blue) with point 2=x, y coordinates of the top right corner of the rectangle}.

Figure 5C:
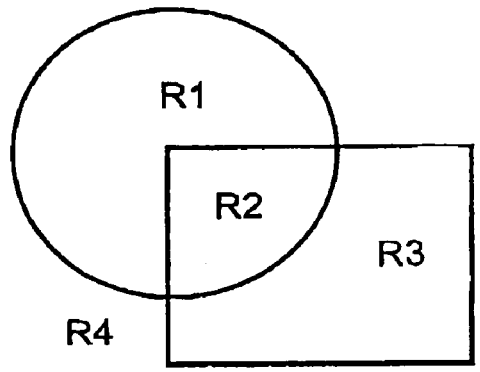
FIG. 5C shows the image space of FIG. 5A subdivided into mutually exclusive regions, as needed in the method of FIG. 8.
Figure 5D:
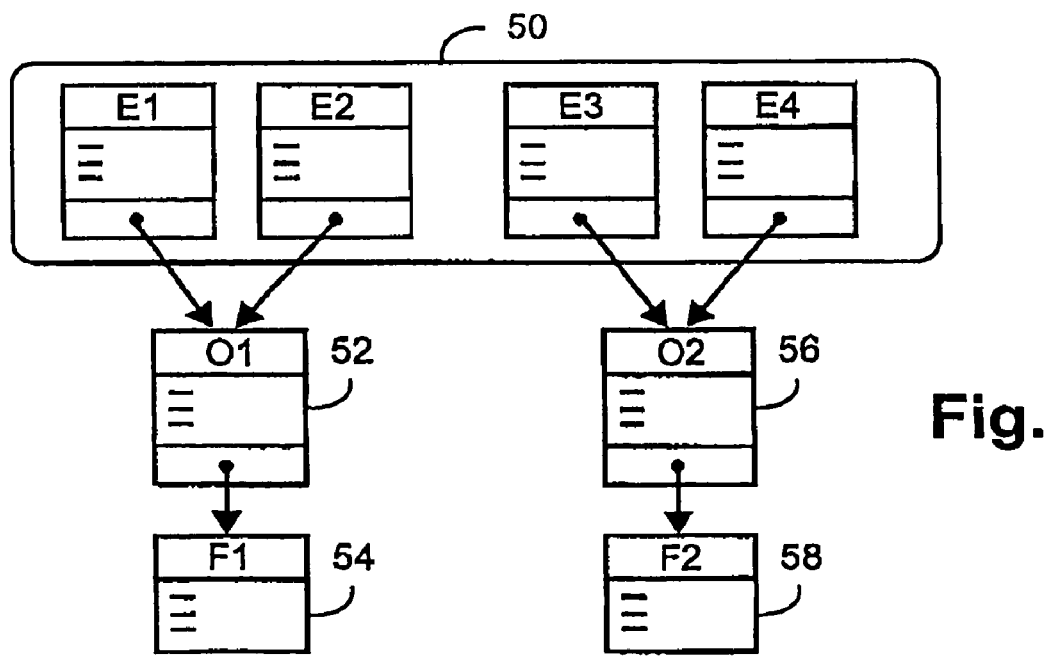
FIG. 5D shows a schematic block diagram of an edge list for the example of FIG. 5A.

FIG. 5D shows the edge list 50 for the image of FIG. 5A. Edges E1 and E2 point to the level data 52 containing drawing information for the object O1, and edges E3 and E4 point to the level data 56 of object O2. Level data 52 and 56 point to the fill data 54 and 58 respectively containing fill information for the objects O1, O2.

With the data structured in the described manner, the display list can be rendered from the list of edges. This is referred to as an edge-based display list.

In the example of FIG. 5A, the display list is the edge list {E1, E2, E3, E4}.

The display list is firstly sorted by ascending y coordinate and then by ascending x coordinate when y coordinates are equal. Sorting the edge list {E1, E2, E3, E4} for the example of FIG. 5A leaves the order of the edges unchanged.

3.0 Object Preparation

Figure 2:
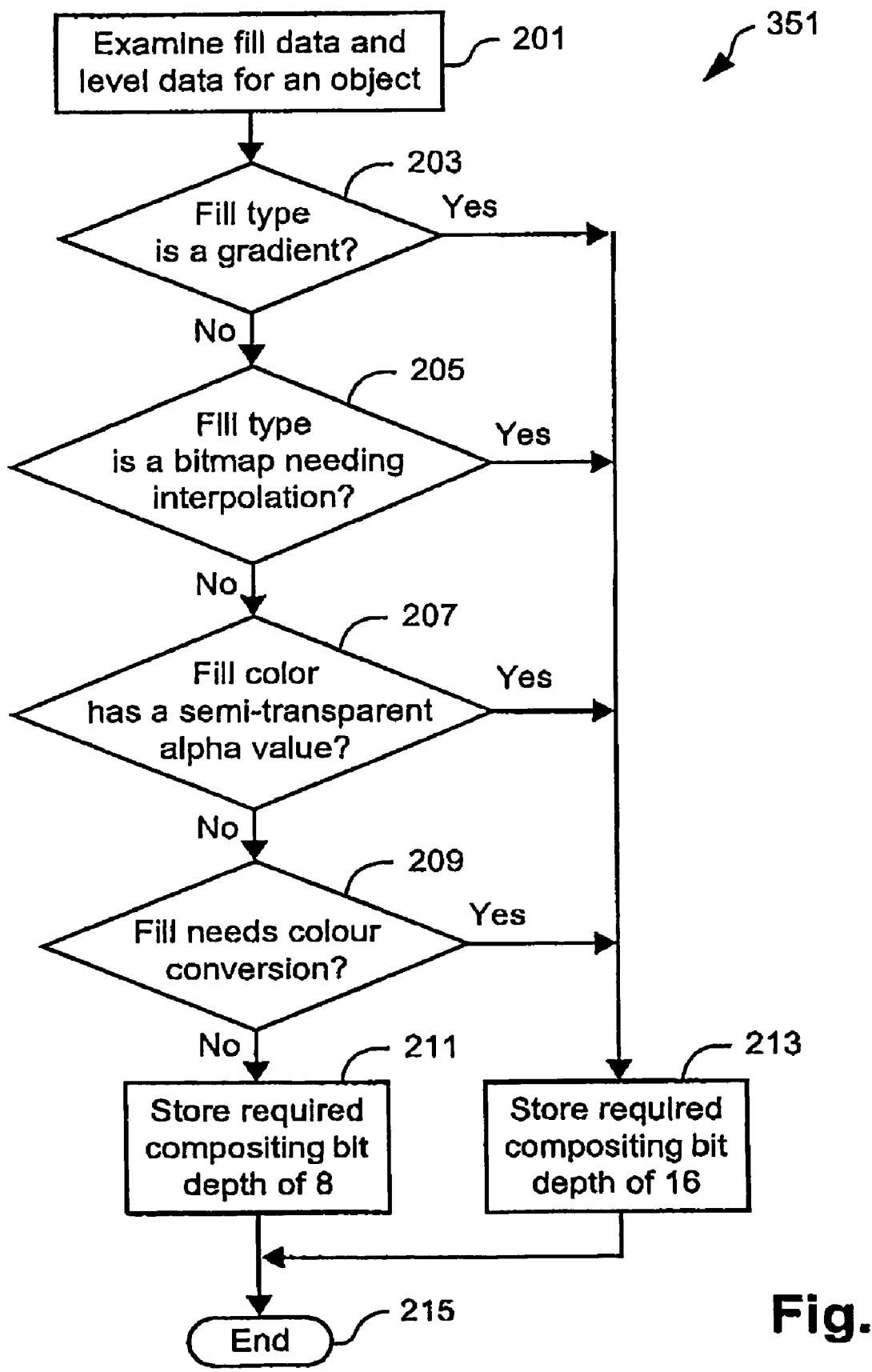
FIG. 2 is a flowchart of a method for determining the required compositing bit depth for an object as used in the method of FIG. 3.

Each object in the display list must be prepared for rendering with dynamic bit depth selection. FIG. 2 is a flowchart illustrating a preparation process 351 which may be applied to each object. The first step 201 examines the fill data and level data for the object. In step 203, the process checks if the fill type of the object is a gradient. If not, step 205 checks if the fill type is a bitmap needing interpolation by checking the flag associated with a bitmap fill. If not, step 207 checks if the fill color has a semi-transparent alpha value. If not, step 209 checks if the fill color needs to be color converted. If not, the object is determined to require 8 bit compositing, and step 211 stores bit-depth data to indicate that the object requires 8 bit compositing. The process then terminates in step 215.

If any of the conditions in step 203, 205, 207, or 209 are satisfied (i.e. any of the YES options in step 203, 205, 207, or 209), then the object is determined to require 16 bit compositing, and step 213 stores bit-depth data to indicate that the object requires 16 bit compositing. The process then terminates in step 215.

When applied to the display list of FIG. 5A, the process is performed twice; once for O1 and once for O2. Object O1 does not have a gradient fill (step 203), or a bitmap fill requiring interpolation (step 205), or a semi-transparent fill (step 207), or a fill needing color conversion (step 209), so O1 is assigned a required compositing bit depth of 8 (step 211), and the object preparation process terminates for object O1 (step 215).

Object O2 has a gradient fill (detected in step 203), so O2 is assigned a required compositing bit depth of 16 (step 213), and the object preparation process terminates for object O2 (step 215).

The method of FIG. 2 selects between two bit depths. In other arrangements a greater number of bit depths may be available for each object. The tests of steps 203, 205, 207 and 209 relate to four cases in which a higher bit depth is desirable. It will be appreciated that further tests may be added to cater for additional cases where a higher or lower bit depth is appropriate.

4.0 Rendering Using a Pixel Sequential Rendering Method

In a first arrangement, a pixel sequential rendering method is used by the rendering module 609 to generate the color and opacity for the pixels one at a time in raster scan order. At any pixel currently being scanned and processed, the pixel sequential rendering method composites only those exposed objects that are active at the currently scanned pixel.

The pixel sequential rendering method determines that an object is active at a currently scanned pixel if that pixel lies within the boundary of the object. The renderer 609 achieves this by reference to a fill counter associated with that object. The fill counter keeps a running fill count that indicates whether the pixel lies within the boundary of the object. When the renderer 609 encounters an edge associated with the object, the renderer 609 increments or decrements the fill count depending upon the direction of the edge. The renderer 609 is then able to determine whether the current pixel is within the boundary of the object depending upon the fill count and a predetermined fill rule.

The renderer 609 when using the pixel sequential rendering method determines whether an active object is exposed with reference to a flag associated with the object. This flag associated with an object indicates whether or not the object obscures lower priority objects. That is, the flag indicates whether the object is partially transparent, in which case the lower priority active objects will make a contribution to the color and opacity of the current pixel. Otherwise, the flag indicates that the object is opaque, in which case active lower priority objects will not make any contribution to the color and opacity of the currently scanned pixel. The pixel sequential rendering method determines that an object is exposed if it is the uppermost active object, or if all the active objects above the object have their corresponding flags set to transparent.

The renderer 609 then composites these exposed active objects to determine and output the color and opacity for the currently scanned pixel. A framestore is not always required to hold the output of a pixel sequential renderer, since the order in which pixels are generated may the same as the order in which pixel data is needed by the target device 611. However, if a framestore is used, the framestore has a bit depth equal to the output bit depth of the renderer 609.

4.1 Determining Active Edges

Figure 3:
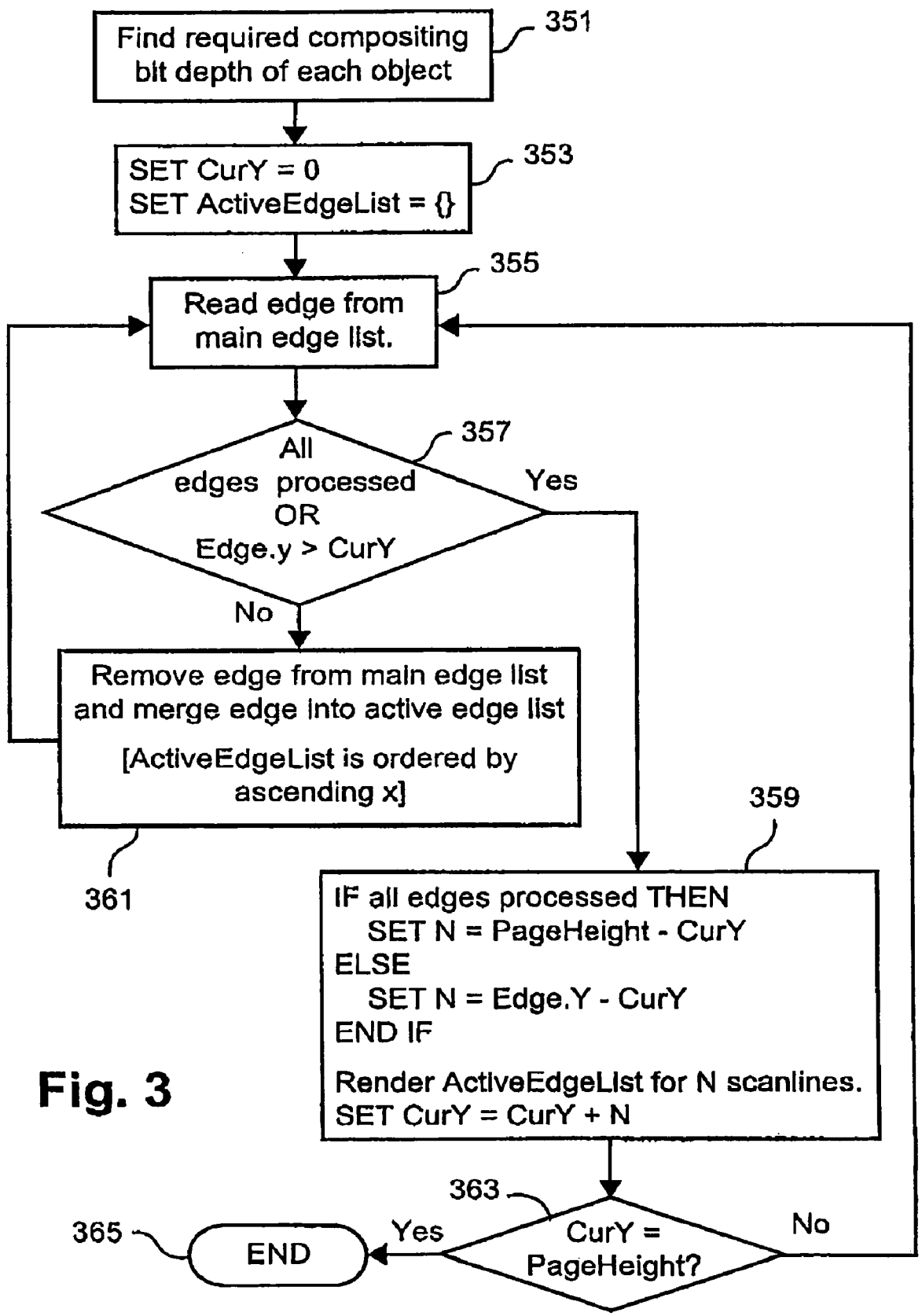
FIG. 3 is a flowchart of a method for rendering a page of graphical objects using pixel-sequential rendering.

FIG. 3 is a flow chart illustrating the method of rendering a page of graphical objects. In particular FIG. 3 illustrates how the active edges are determined from the main edge list in a pixel sequential rendering method. The main edge list contains all the edges to be rendered, and the active edge list is a temporary list of edges that intersect a current scanline.

Step 351 is a preparation step which determines the minimum required compositing bit depth for each object. This step is described in more detail above with reference to FIG. 2.

Step 353 is an initializing step in which the variable CurY is set to zero and the active edge list is set to the empty set. Then, in step 355, the renderer 609 reads an edge from the main edge list. In step 357 the renderer 609 checks whether all edges in the main edge list have been processed, or whether the y-value of the currently-read edge, Edge.y, is greater than the value stored in the variable CurY.

If neither of these conditions is satisfied (the NO option of step 357) then the process proceeds to step 361, in which the current edge is removed from the main edge list and merged into the active edge list. Edges in the active edge list are ordered by ascending x-value; that is, the order along the scanline. Once the current edge is added to the active edge list, the process returns to step 355 to consider the next edge from the main edge list.

If either of the conditions in step 357 is satisfied (the YES option of step 357), then in step 359 the renderer 609 determines a number of scanlines to render, N. If all edges in the main edge list have been processed, N is set to the number of scanlines remaining on the page; that is, the difference between the page height and the current scanline:

$N=\text{PageHeight}-\text{CurY}.$

If, however, there are still edges to process, then N is set to the number of scanlines between CurY and the scanline on which the currently-read edge commences:

$N=\text{Edge.Y}-\text{CurY}.$

Once the number of scanlines has been determined, the renderer 609 renders the active edge list for N scanlines and then updates the current scanline:

$\text{CurY}=\text{CurY}+N.$

For the pixel-sequential rendering method, the rendering of the N scanlines is further described with reference to FIG. 4.

Next, in step 363, the renderer 609 checks whether the updated CurY is equal to the page height. If so, the process of determining active edges terminates 365. If, however, CurY is less than the page height (the NO option of step 363) then process flow returns to step 355 to process the next edge from the main edge list.

4.2 Rendering Scanlines

Figure 4:
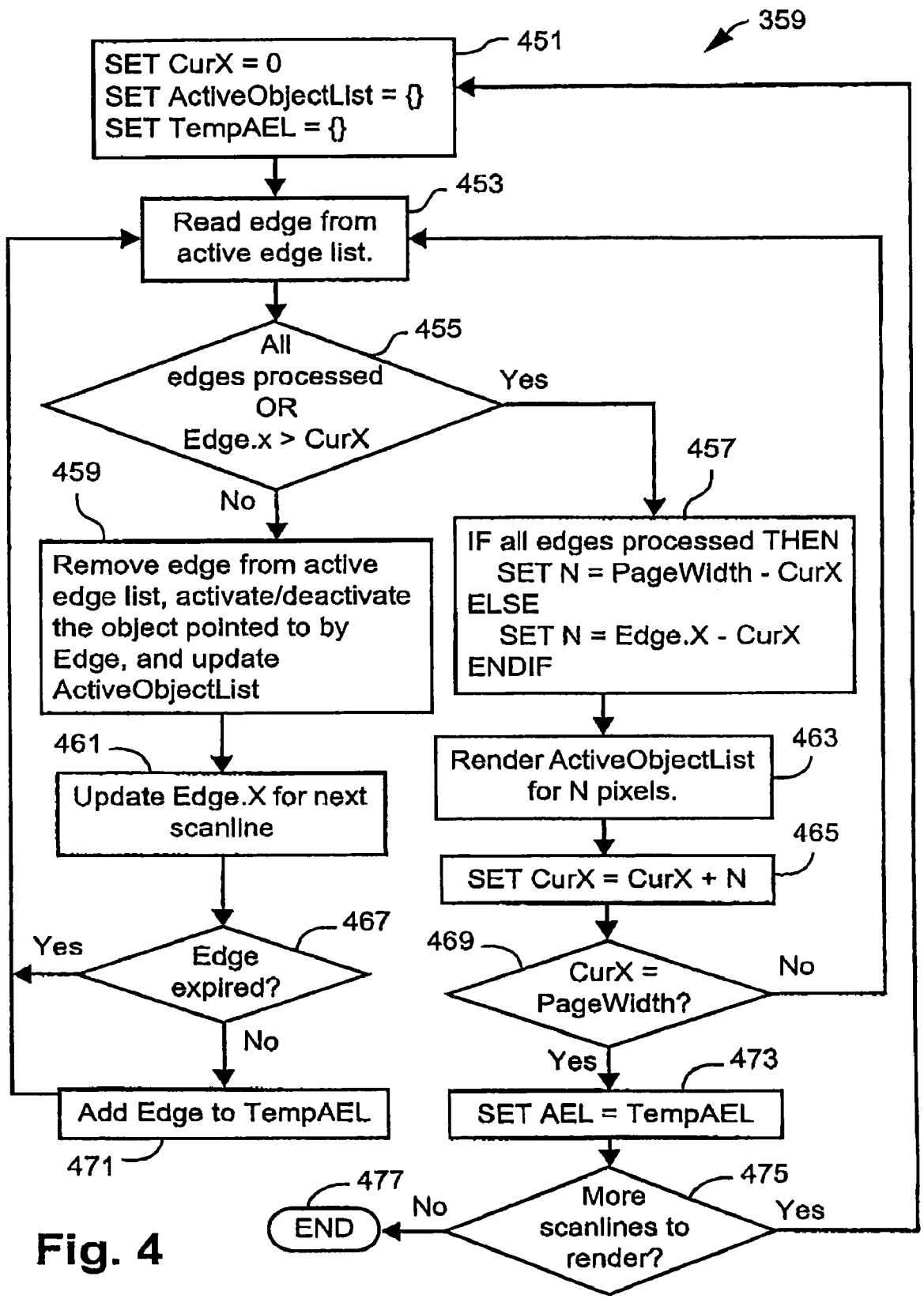
FIG. 4 is a flowchart of a method for rendering a scanline as used in the method of FIG. 3.

The flowchart of FIG. 4 illustrates how scanlines are rendered in the pixel-sequential rendering method. The process of FIG. 4 is invoked by step 359 of FIG. 3.

In the initializing step 451, the rendering apparatus 609 sets an index CurX to zero and sets both the active object list and a Temporary Active Edge List (TempAEL) to the empty set. Then, in step 453, the process enters a loop that continues until the end of the scanline, i.e. when CurX equals the page width. In step 453, the renderer 609 reads an edge "Edge" from the active edge list (AEL). Then, in step 455, the renderer 609 checks whether all edges in the active edge list have been processed, or whether Edge.X, the intersection of the current scanline and the currently-read edge, is greater than the index CurX. If either of these conditions is met, process flow proceeds to step 457. If the conditions are not met (the NO option of step. 455), process flow proceeds instead to step 459.

In step 459, the currently-read edge is removed from the active edge list and the object pointed to by the currently-read edge is activated or deactivated, as appropriate. If the object is activated, it is added to an active object list. Otherwise, if the object is deactivated, it is removed from the active object list.

In the following step 461, Edge.X is updated to indicate the intersection of the currently-read edge with the next scanline. Next, in step 467, the currently-read edge is tested to see if it expires on the current scanline. If not (the NO option of step 467), execution proceeds to step 471 where the edge is added to the temporary AEL, TempAEL, in the correct position to maintain the ascending x-order of that list. Otherwise (the YES option of step 467), or following step 471, process flow returns to step 453 to read the next edge from the active edge list.

In step 457 a number of pixels to render, N, is determined. If all edges in the active edge list have already been processed, N is set to the difference between the page width and the index CurX. Otherwise N is set to (Edge.X−CurX), i.e. the difference between the current index and the position of the currently-considered active edge.

Then, in step 463, the active object list is rendered for N pixels, as described in more detail with reference to FIG. 1.

In step 465 the index CurX is updated to (CurX+N). Then step 469 checks whether CurX equals the page width. If so, in step 473 the contents of the temporary edge list are copied to the active edge list. Step 475 checks whether there are more scanlines to be rendered. If so (the YES option of step 475), the process loops back to step 451 to render the next scanline, or (the NO option of step 475) returns 477 to step 359 of FIG. 3.

If CurX has not reached the page width (the NO option of step 469), then process flow returns to step 453.

4.3 Rendering Pixels on a Scanline

Figure 1:
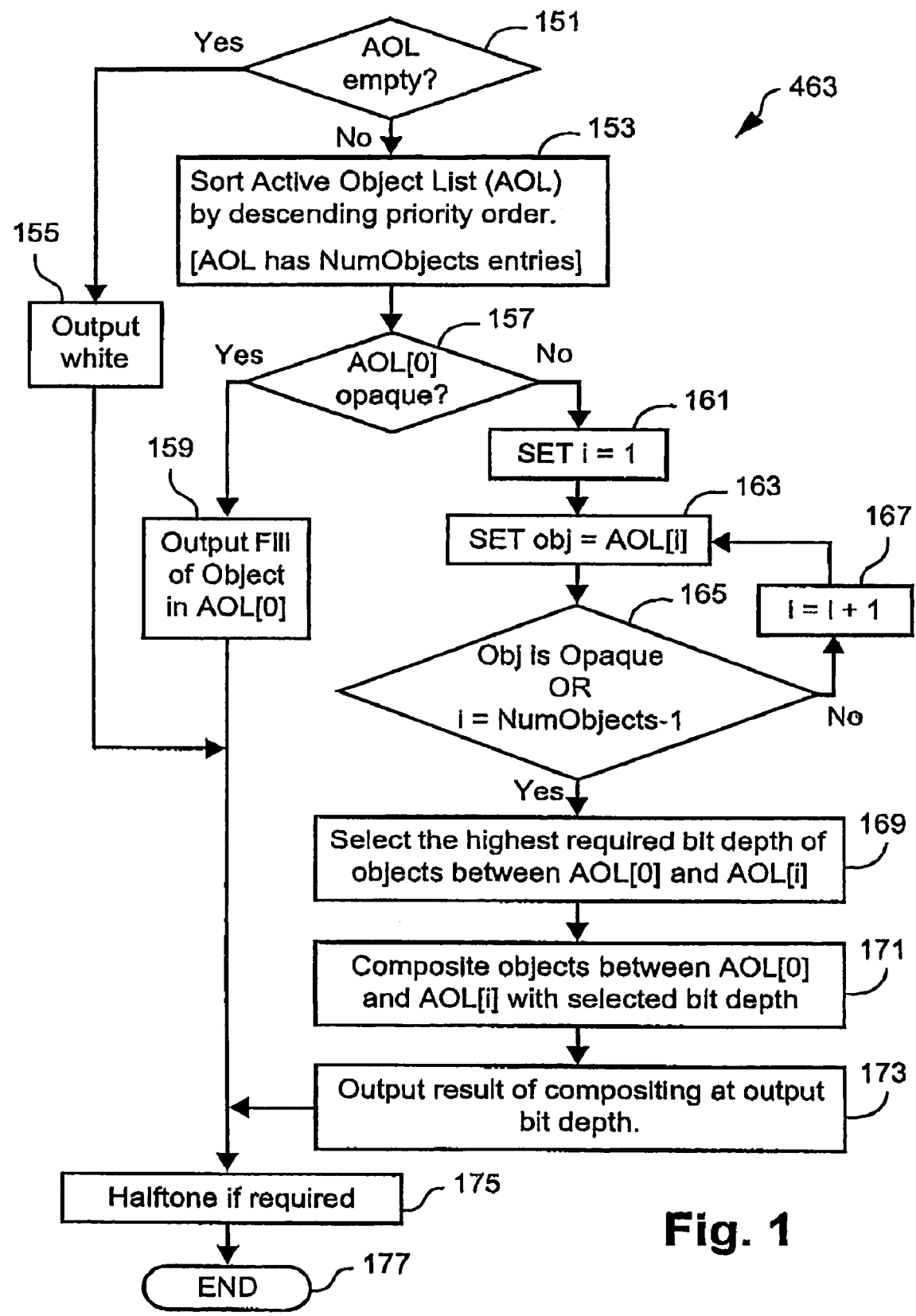
FIG. 1 is a flowchart of a method for determining which objects contribute to a pixel run in a pixel sequential rendering method and compositing the pixel run using dynamic bit depth, as used in the method of FIG. 4.

The flowchart of FIG. 1 illustrates a method of rendering pixels on a scanline in which only the highest opaque object and any transparent objects lying above the highest opaque object are composited and output. Compositing is performed using the highest required compositing bit depth of the objects to be composited. The steps of FIG. 1 are invoked by step 463 of FIG. 4.

In step 151 the renderer 609 checks whether the active object list (AOL) is empty. If so (the YES option of step 151), the renderer 609 outputs white (the page background) for N pixels at the output bit depth. Alternatively, the background may be output at the compositing bit depth or another bit depth, and halftoned in step 175 to the output bit depth. The process terminates in step 177 and returns to step 463.

If the active object list is not empty (the NO option of step 151) then process flow proceeds to step 153, in which the active object list is sorted by descending priority order. The number of entries in the active object list is NumObjects.

Then, in step 157, the renderer 609 checks whether the first object in the active object list (AOL[0]) is opaque. If the object is opaque, step 159 outputs the fill of the object in AOL[0] at the output bit depth. Alternatively, the fill is output at the compositing bit depth or another bit depth and halftoned in step 175 to the output bit depth. The process terminates in step 177. In this case there is no need to consider any other objects in the active object list, since the topmost object is opaque.

If the topmost object is not opaque (the NO option of step 157) then the renderer in step 161 sets index i=1. In step 163 Obj is set to the object in the ith entry of the active object list. Step 165 checks whether Obj is opaque or whether the index i equals the total number of objects, (NumObjects−1), in the active object list.

If neither of the conditions in step 165 is met (the NO option of step 165), then process flow proceeds to step 167, which increments the index, i=i+1. The process then returns to step 163 to consider the next object in the active object list.

If either condition is met (the YES option of step 165) then the renderer 609 in step 169 inspects the required compositing bit depths associated with objects AOL[0] to AOL[i], and selects the highest bit depth. The required compositing bit depths for each object were previously determined and stored by the process of FIG. 2.

Step 171 composites objects AOL[0] to AOL[i] together at the bit depth selected by step 169. This step involves choosing and invoking one of a set of possible compositing routines. Different classes of compositing routines are used depending on the initial bit depth of the objects being composited and the selected bit depth. A numbered list of classes of compositing routines sufficient for the described arrangement is given below. Typically, each routine has two inputs; object A and object B. The classes of compositing routines are:

(1) No conversion on input objects, and composite in 8 bits;

(2) Convert object A from 16 bits to 8 bits, and composite in 8 bits;

(3) Convert object B from 16 bits to 8 bits, and composite in 8 bits;

(4) Convert objects A and B from 16 bits to 8 bits, and composite in 8 bits;

(5) No conversion on input objects, and composite in 16 bits;

(6) Convert object A from 8 bits to 16 bits, and composite in 16 bits;

(7) Convert object B from 8 bits to 16 bits, and composite in 16 bits; and (8) Convert objects A and B from 8 bits to 16 bits, and composite in 16 bits.

Step 173 takes the result of compositing step 171, which is in the bit depth at which compositing was performed, and converts the result to the output bit depth, if the compositing bit depth is not the same as the output bit depth. Alternatively, step 173 outputs the result of compositing step 171 at the compositing bit depth or another bit depth, and step 175 halftones to the output bit depth. The process terminates in step 177.

In compositing, graphic objects with transparency data may be combined using operators such as the well-known Porter and Duff operators (described in "Compositing Digital Images", Porter, T, Duff, T; Computer Graphics, Vol 18 No 3 (1984) pp 253-259), in which the opacity is modeled as the proportion of a pixel that is covered by opaque data. When combining color and opacity from two Objects A and B (Source and Destination respectively), the pixel is divided into four regions:

a region where both objects are opaque, of area $\alpha_A \alpha_B$ [Source and Destination];

a region where only Object A is opaque, of area $\alpha_A(1-\alpha_B)$ [Source Only];

a region where only Object B is opaque, of area $\alpha_B(1-\alpha_A)$ [Destination Only]; and a region where both objects are transparent, of area $(1-\alpha_A)(1-\alpha_B)$ [No Source or Destination], where:

$\alpha_A$=opacity (or "alpha") of Object A $\alpha_B$=opacity of Object B

The mathematical descriptions of these regions are used to define the twelve compositing operators. All operators provide distinct combinations of these regions. Porter and Duff operators can be summarized by three terms within a function that represents the three regions that may be painted by any of the operators. The fourth region where no source (Object A) or destination (Object B) color is present cannot contribute to the resultant color or opacity. The resultant color multiplied by the resultant opacity at any pixel is given by:

$$C_{result}\alpha_{result} = F(C_A, C_B)\alpha_A\alpha_B + Y.C_A\alpha_A(1-\alpha_B) + Z.C_B\alpha_B(1-\alpha_A)$$

where:

$F(C_A, C_B)\alpha_A\alpha_B$=a function selecting either the source or destination color or no color, multiplied by the product of the source and destination alpha. Hence this term can only be one of the following; $C_A\alpha_A\alpha_B$, $C_B\alpha_A\alpha_B$ or 0. This term represents the [Source and Destination] region.

$Y.C_A\alpha_A(1-\alpha_B)$=the product of the source color, source opacity or alpha, inverse of the destination opacity, and a binary factor (Y; either 1 or 0). This term represents the [Source Only] region.

$Z.C_B\alpha_B(1-\alpha_A)$=the product of the destination color, destination alpha, inverse of the source opacity, and a binary factor (Z; either 1 or 0). This term represents the [Destination Only] region.

The resultant opacity at any point is given by:

$$\alpha_{result} = X.\alpha_A\alpha_B + Y.\alpha_A(1-\alpha_B) + Z.\alpha_B(1-\alpha_A)$$

where:

$X.\alpha_A\alpha_B$=the product of the source opacity, destination opacity, and a binary factor (X; either 1 or 0). This term represents the [Source and Destination] region.

$Y.\alpha_A(1-\alpha_B)$=the product of the source opacity, inverse of the destination opacity, and a binary factor (Y; either 1 or 0). This term represents the [Source Only] region.

$Z.\alpha_B(1-\alpha_A)$=the product of the destination opacity, inverse of the source opacity, and a binary factor (Z; either 1 or 0). This term represents the [Destination Only] region.

Table 1 lists the 12 Porter and Duff operators. A textual description is provided explaining how the operators relate to the equations and terms defined above.

objects are initially represented in 8 bits, a compositing routine of class (8) (convert objects A and B from 8 bits to 16 bits, and composite in 16 bits) is called. If the desired output bit depth is 8 bits, then step 173 outputs the resultant pixels of compositing step 171 at 8 bits per channel, by downscaling the output pixels from 16 bits. If the desired output bit depth is 16 bits, then step 173 outputs the resultant pixels of compositing step 171 at 16 bits per channel, performing no conversion.

TABLE 1

The twelve Porter and Duff operators

| Operator | $C_{result}\alpha_{result}$ | $\alpha_{result}$ | $F(C_A, C_B)$ | X | Y | Z | Description |
|---|---|---|---|---|---|---|---|
| clear | 0 | 0 | 0 | 0 | 0 | 0 | None of the terms are used. |
| src | $C_A\alpha_A$ | $\alpha_A$ | $C_A$ | 1 | 1 | 0 | Only the terms that contribute source color are used. |
| dst | $C_B\alpha_B$ | $\alpha_B$ | $C_B$ | 1 | 0 | 1 | Only the terms that contribute destination color are used. |
| src-over | $C_A\alpha_A + C_B\alpha_B(1-\alpha_A)$ | $\alpha_A + \alpha_B(1-\alpha_A)$ | $C_A$ | 1 | 1 | 1 | The source color is placed over the destination color. |
| dst-over | $C_B\alpha_B + C_A\alpha_A(1-\alpha_B)$ | $\alpha_B + \alpha_A(1-\alpha_B)$ | $C_B$ | 1 | 1 | 1 | The destination color is placed over the source color. |
| src-in | $C_A\alpha_A\alpha_B$ | $\alpha_A\alpha_B$ | $C_A$ | 1 | 0 | 0 | The source that overlaps the destination, replaces the destination. |
| dst-in | $C_B\alpha_A\alpha_B$ | $\alpha_A\alpha_B$ | $C_B$ | 1 | 0 | 0 | The destination that overlaps the source, replaces the source. |
| src-out | $C_A\alpha_A(1-\alpha_B)$ | $\alpha_A(1-\alpha_B)$ | 0 | 0 | 1 | 0 | The source that does not overlap the destination replaces the destination. |
| dst-out | $C_B\alpha_B(1-\alpha_A)$ | $\alpha_B(1-\alpha_A)$ | 0 | 0 | 0 | 1 | The destination that does not overlap the source replaces the source. |
| src-atop | $C_A\alpha_A\alpha_B + C_B\alpha_B(1-\alpha_A)$ | $\alpha_B$ | $C_A$ | 1 | 0 | 1 | The source that overlaps the destination is composited with the destination. |
| dst-atop | $C_B\alpha_A\alpha_B + C_A\alpha_A(1-\alpha_B)$ | $\alpha_A$ | $C_B$ | 1 | 1 | 0 | The destination that overlaps the source is composited with the source and replaces the destination. |
| xor | $C_A\alpha_A(1-\alpha_B) + C_B\alpha_B(1-\alpha_A)$ | $\alpha_A + \alpha_B - 2\alpha_A\alpha_B$ | 0 | 0 | 1 | 1 | The non-overlapping regions of source and destination are combined. |

It is common, however, only to use the over operation, where all three contributing regions are used, and the color of the region where both objects are opaque is taken from the color of the topmost object.

As an example of the application of the process of FIG. 1, consider the run of pixels going right from the centre of the circular object O1 to the edge E2 in FIG. 5B. This is the pixel run on scanline E3.Y (i.e. the scanline on which edge E3 begins), between pixels E3.X and E2.X. For this run of pixels both objects are active and the active object list is AOL={O1, O2}.

At step 151, the AOL is checked to see if it is empty. The AOL contains two entries, so execution proceeds to step 153. The AOL is sorted by descending priority order, resulting in AOL={O2, O1}. The value of NumObjects is 2. Step 157 checks whether the first entry in the list is opaque. O2 is not opaque, so execution proceeds to step 161. The counter i is initialized to one at step 161, and then at step 163 the variable Obj is set to the object at location AOL[i], which in this case is O1. At step 165, since O1 is opaque, execution proceeds to step 169.

The required compositing bit depth of O2 (which is in AOL[0]) is 16, while the required compositing bit depth of O1 (which is in AOL[1]) is 8. (These values were previously determined for each object according to the process of FIG. 2.) Step 169 selects a compositing bit depth of 16, which is the highest required compositing bit depth of the objects in AOL[0] and AOL[1].

Step 171 composites the objects together at the selected bit depth of 16. Because compositing is in 16 bits, and both input Step 175 halftones the pixels output by step 173 if required, and the process terminates in step 177.

5.0 Further Arrangements

Several alternative arrangements are described below. The arrangements may be implemented in parallel with other disclosed arrangements. Some arrangements may be implemented alone or in combination with other described arrangements.

5.1 Selecting Between More than Two Bit Depths

In an alternative arrangement, the method of finding the required compositing bit depth of each object (step 351, expanded in FIG. 2) may vary. One variation is to determine more than the two possible compositing bit depths of step 211 and 213. For example, depending on features of the objects, required compositing bit depths of 4, 8, or 16 may be determined.

Another variation to the method of FIG. 2 uses the initial bit depth of the object and the desired output bit depth as parameters which may affect the determined required compositing bit depth. For example, if an object is found to contain a gradient (step 203), a further test may be applied, if the object is not semi-transparent or requiring color conversion. The further test considers the desired output bit depth, such that if the output bit depth is 8, the required compositing bit depth is 8, whereas if the output bit depth is 16, the required compositing bit depth is 16.

Other variations of this kind are possible in order to optimize the choice of the required compositing bit depth for different objects, for a particular renderer. Yet another variation involves inspecting fewer than or more than the four features of steps 203, 205, 207, and 209. A further variation involves changing the number of features to inspect depending on configuration parameters given to the rendering system 603 when the rendering system is initialized.

5.2 Determining the Required Compositing Bit Depth During Rendering

In a further arrangement, the step of determining the required bit depth of each object to be rendered (step 351, expanded in FIG. 2) occurs not as a preparatory step, but during rendering. For example, step 351 may be inserted prior to step 169, and invoked for each object between AOL[0] and AOL[i]. The result of step 351 may additionally be stored with the object for which step 351 was invoked. As a consequence, step 351 may be skipped for this object in future compositing operations involving the same object.

5.3 Compositing Routines Working at a Constant Bit Depth

In a further arrangement, the step of compositing a set of objects at the selected bit depth (step 171) is altered. In the arrangements described with respect to FIGS. 1 to 4, different classes of compositing routines exist which can accept as input objects having a different bit depth to the depth at which the routines will perform compositing. An alternative is for compositing routines to input, composite, and output pixels at a constant bit depth. In this alternative, an explicit bit depth conversion step is required for any input object which is at a different bit depth to the compositing bit depth. Such bit conversion occurs before the input object is composited by a compositing routine.

This new bit depth conversion step would be inserted between steps 169 and 171. Step 169 determines the highest required compositing bit depth of all objects under consideration. The conversion step converts objects as necessary to the required compositing bit depth, and then step 171 composites the objects using a compositing routine of the required compositing bit depth.

5.4 Output Image with Multiple Bit Depths

In a further arrangement, the output image is made up of parts having different bit depths, as opposed to being of a constant predetermined bit depth. In this arrangement, no conversion of pixels in step 173 is required. Rather, step 173 outputs pixels at the same bit depth at which the pixels are composited. In this case, step 173 also outputs secondary data that specifies the bit depth of the current area of the image. Known techniques may be used to store image data where the pixel data in different areas of the image are represented in different bit depths. An example of such storage techniques may be found in U.S. Pat. No. 5,295,000, issued on 15 Mar. 1994.

Furthermore, step 173 may selectively scale up or down the bit depth of pixels received from step 171, depending on the content of the pixels, before outputting the pixels and the secondary bit depth data. For example, parts of an image which are black or white may be scaled down to 1 bit per channel before being output, even if compositing was performed at a higher bit depth.

5.5 Rendering with a Region-Based Renderer

Figure 8:
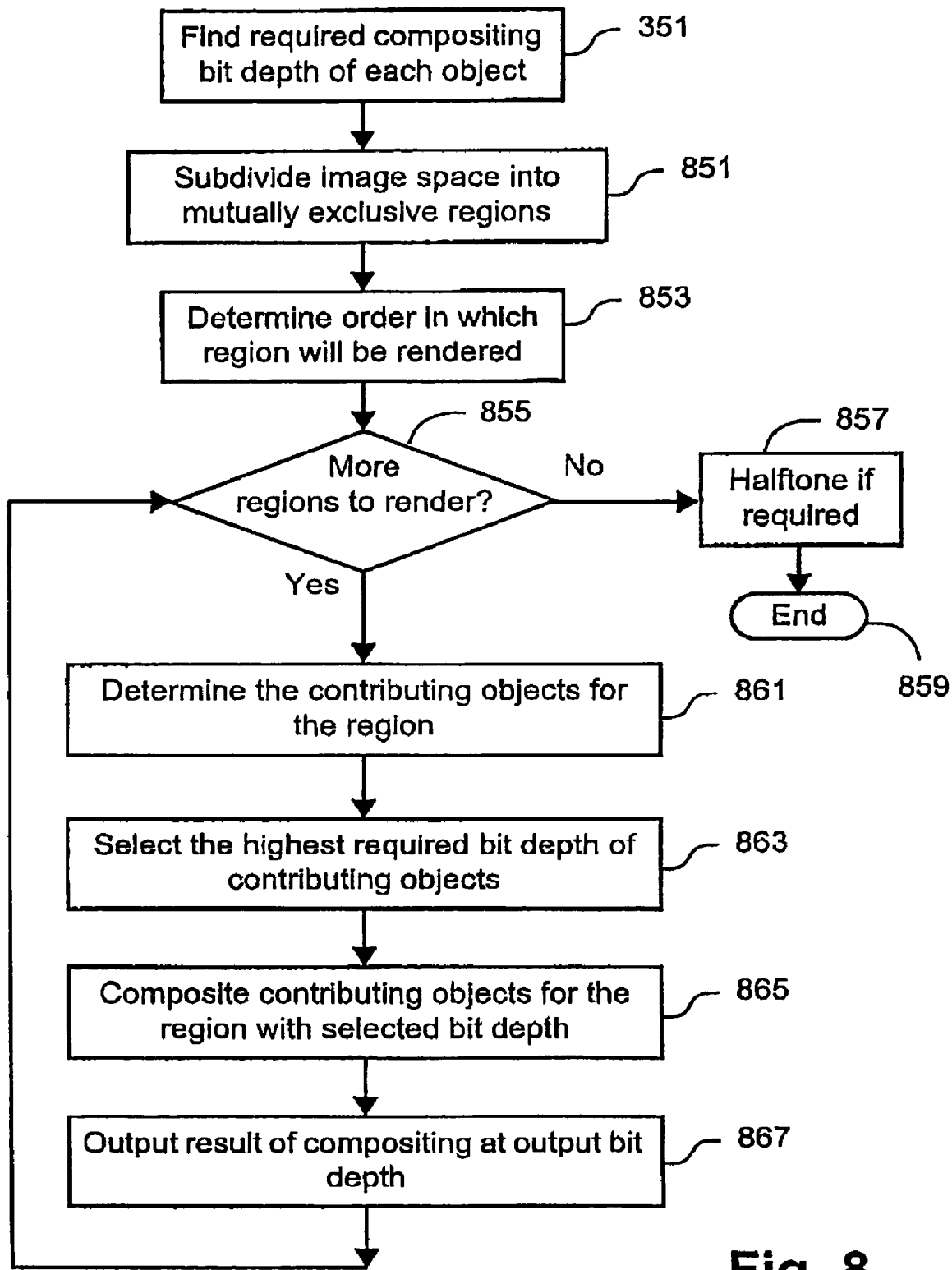
FIG. 8 is a flowchart of a region-based method for compositing with dynamically selected bit depth.

In a further arrangement, the steps of dynamically determining bit depths (i.e. preparatory step 351 and variations of compositing steps 169, 171, and 173) may be implemented in a region-based renderer, instead of the pixel sequential renderer described above with reference to FIGS. 1 to 4. This arrangement preferably uses a framestore of the same bit depth as the output bit depth, in which the composited pixels for each region are stored. The method using the region-based renderer is illustrated in the flowchart of FIG. 8.

Step 351 (expanded in FIG. 2) is performed to determine the required compositing bit depth of each object. Step 851 subdivides the image space into mutually exclusive regions, such that every pixel of a given region has the same set of contributing objects. Step 853 determines an order in which to render the regions.

A loop starts in step 855 to iterate through the regions in the order selected in step 853. Step 855 checks whether there is a further region to render. If so (the YES option of step 855), then process flow proceeds to step 861, which determines the set of objects that contribute to the region. Next, step 863 selects the highest required compositing bit depth of the contributing objects, and step 865 composites the region at the selected bit depth. Then step 867 outputs the result of compositing at the output bit depth. Process flow then returns to step 855 to check whether there are further regions to process.

If in step 855 there are no more regions to render (the NO option of step 855), then the output image is halftoned (if required) in step 857, and the process terminates in step 859.

As an example to illustrate region-based rendering, consider FIG. 5A. The objects are prepared according to step 351 as previously described. Object O1 requires 8 bits and object O2 requires 16 bits for their respective compositing bit depths. In step 851, the image space is subdivided into mutually exclusive regions R1, R2, R3, and background region R4, as shown in FIG. 5C. Step 853 may determine that regions are rendered in the order R2, R3, R1, and R4 (or any other order). Step 855 tests if there are more regions to be rendered. There are four regions still to be rendered. Region R2 is rendered first. Step 861 determines that region R2 has two contributing objects; O1 (requiring 8 bits) and O2 (requiring 16 bits). The highest required compositing bit depth, selected by step 863, is 16. In step 865, the pixels of objects O1 and O2 are composited together at the selected bit depth of 16, using a compositing routine of class (8) (Convert objects A and B from 8 bits to 16 bits, and composite in 16 bits). In step 867, the pixels are output to a framestore having the same bit depth as the output bit depth.

Steps 861, 863, 865, and 867 are repeated for each of the remaining three regions R3, R1 and R4. Finally, step 855 determines that all regions have been rendered, and the output image is halftoned (if required) in step 857. The process terminates in step 859.

5.6 Rendering in an Object-Based Renderer

In a further arrangement, the steps of dynamically determining bit depths (preparatory step 351 and compositing steps 169, 171, and 173) may be implemented in an object-based renderer, instead of the pixel sequential renderer described with reference to FIGS. 1 to 4.

An object-based renderer uses what is known in the art as the Painter's Algorithm. In this arrangement, objects are rendered one at a time to a framestore in ascending priority order, and are composited with the pixels already in the framestore. Typically, before any objects are rendered, a background color of white is set for the whole framestore. In order to achieve the benefits of the dynamically selected bit depths, the framestore bit depth should be equal to the highest possible compositing bit depth, which may be higher than the output bit depth. Secondary data stores the highest required compositing bit depth for each part of the framestore. The secondary data is updated when each object is rendered.

Figure 9:
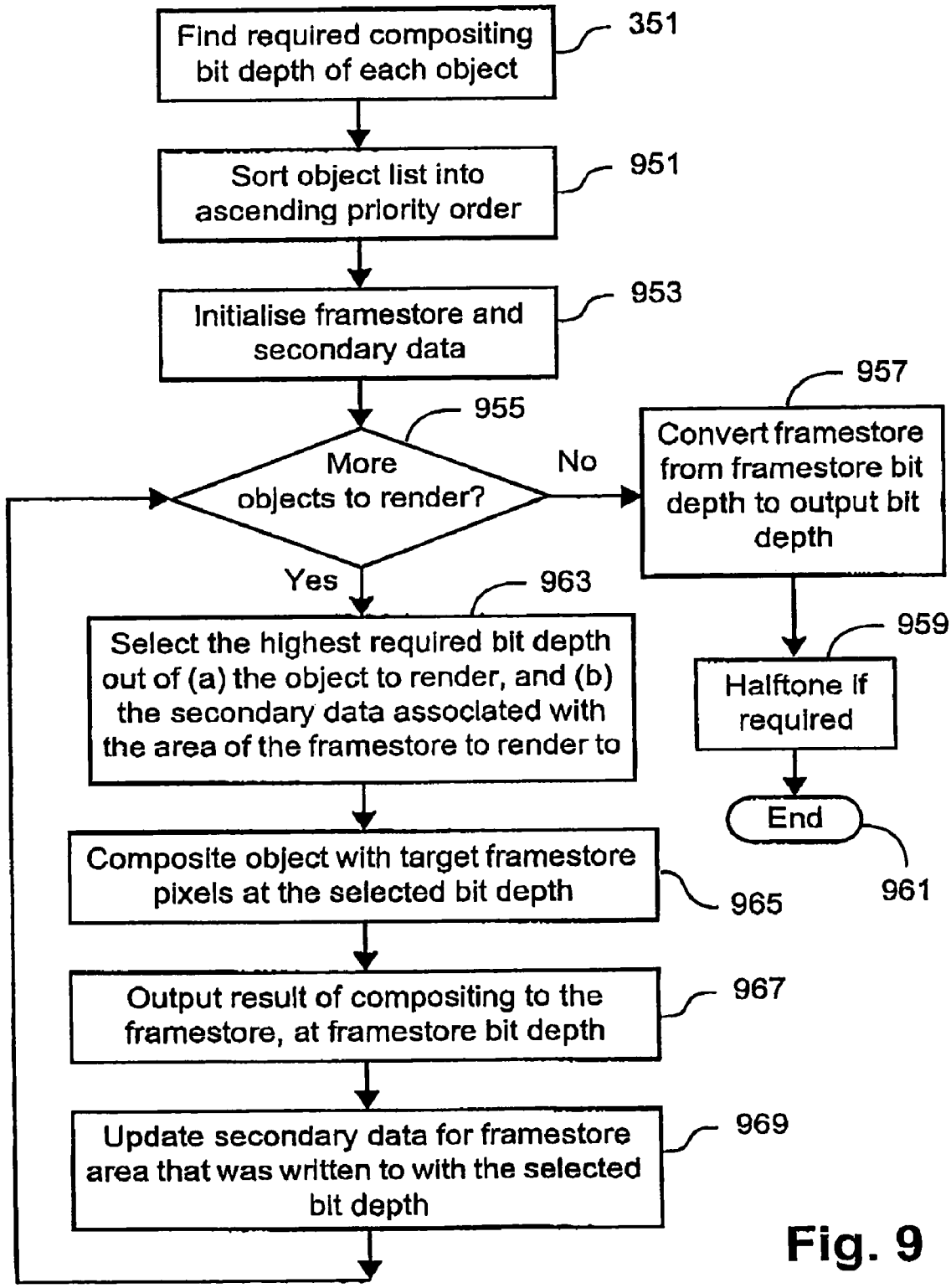
FIG. 9 is a flowchart of an object-based method for compositing with dynamically selected bit depth.

The steps of the arrangement using object-based rendering are shown in the flowchart of FIG. 9. First, step 351 (expanded in FIG. 2) is performed to determine the required compositing bit depth of each object. Step 951 sorts the object list into ascending priority order. Step 953 initializes the framestore pixels to the background color (usually white). Step 953 also initializes the secondary data, setting the required compositing bit depth of all pixels in the framestore to the lowest available compositing bit depth. The process then enters a loop to render each object in priority order. Step 955 checks whether there is a further object to render. If so, (the YES option of step 955), then step 963 examines the required compositing bit depth out of the further object to be rendered. Step 963 also retrieves and examines the required compositing bit depths from the secondary data for the area which the object will be rendered to. Step 963 selects the highest bit depth out of the examined bit depths. Then step 965 composites the object with the target framestore pixels at the bit depth selected in step 963.

Step 967 writes the output of compositing to the framestore at the framestore bit depth. Step 969 updates the secondary data associated with the area of the output covered by the object just rendered, to store the bit depth at which compositing was performed. Process flow then returns to step 955 to check whether there are further objects to process.

If there are no more objects to render (the NO option of step 955), then step 957 converts the framestore pixels from the framestore bit depth to the output bit depth, if the two bit depths differ. Step 959 halftones the output image if required, and the process terminates in step 961.

As an example to illustrate object-based rendering, consider the objects in FIG. 5A, to be rendered to an output bit depth of 8. Step 351 finds the required compositing bit depth of each object. Object O1 requires 8 bits and object O2 requires 16 bits for their respective compositing bit depths. Step 951 sorts objects O1 and O2 into ascending priority order (O1, O2). Step 953 initializes a framestore of bit depth 16 (the highest available compositing bit depth) to white pixels, and sets the secondary required compositing bit depth of the whole framestore to 8 (the lowest available compositing bit depth). Step 955 tests if more objects are to be rendered. There are two objects to be rendered. Object O1 is rendered first. In step 963, the maximum bit depth of 8 is selected from of the required compositing bit depth of object O1 and the required compositing bit depth held in the secondary data for the area of the framestore to be overlaid by object O1. Step 965 composites the circle object O1 over the white background at the selected compositing bit depth of 8, using a compositing routine of class (2) (Convert object A from 16 bits to 8 bits, and composite in 8 bits), since the pixels input to the compositing routine from the framestore have a bit depth of 16. In step 967, the output of compositing is written to the framestore at the framestore bit depth (16). Step 969 updates the framestore secondary data for the area overwritten by the circle, setting the secondary data to the bit depth at which compositing was done; that is, a bit depth of 8.

Process flow returns to step 955, which determines that object O2 is still to be rendered. Step 963 selects the maximum required compositing bit depth of 16, the selection being made between the bit depth required by object O2, and the required compositing bit depth (8) held in the secondary data for the area of the framestore to be overlaid by object O2. Step 965 composites the rectangle O2 over the background in the framestore (which at this point contains pixel values representing the circle), at the selected bit depth of 16, using a compositing routine of class (7) (Convert object B from 8 bits to 16 bits, and composite in 16 bits). In step 967, the output of compositing is again written to the framestore at the framestore bit depth (16). The framestore secondary data is updated for the area of the rectangle, to record the fact that the required compositing bit depth for that area is now 16. Step 955 determines that all objects have been composited, so step 957 converts the framestore from the framestore bit depth of 16, to the output bit depth of 8. The output image is halftoned if required in step 959, and the process terminates in step 961.

In an alternative implementation of the method of FIG. 9, compositing is handled differently when the framestore has different required compositing bit depths for different regions of the area in which an object will be rendered. In this alternative, the selecting step 963, the compositing step 965, and the output step 967 are performed separately for each such region in the area.

5.7 Selecting a Bit Depth for Individual Compositing Operations

In a further arrangement, rendering steps 169 and 171 are modified to apply to one compositing operation at a time, instead of applying to all compositing operations needed for the compositing of objects AOL[0] to AOL[i]. Instead of selecting the highest required compositing bit depth of objects between AOL[0] and AOL[i] in step 169 and then compositing those objects at the selected bit depth in step 171, the bit depth selection step 169 and compositing step 171 are performed in a loop. One bit depth selection step and one compositing operation are performed during each iteration of the loop, until all objects AOL[0] to AOL[i] have been composited. Thus, more than one bit depth may be used in rendering a single pixel if the pixel involves more than one compositing operation.

For example, consider a case where i=3. First, the highest required compositing bit depth of objects AOL[3] and AOL[2] is selected, and objects AOL[3] and AOL[2] are composited together, at the selected bit depth, into a temporary buffer. Then, the highest required compositing bit depth of objects AOL[3], AOL[2], and AOL[L] is selected, and object AOL[1] and the pixels in the temporary buffer are composited together at the selected bit depth. Finally, the highest required compositing bit depth of objects AOL[3], AOL[2], AOL[1], and AOL[0] is selected, and object AOL[0] and the pixels in the temporary buffer are composited together at the selected bit depth. Step 173 then outputs the result of the compositing operation at the output bit depth.

In an alternative arrangement, the method described in section 5.7 is applied to selected portions of the page being rendered. The remainder of the page may be rendered using the arrangement described in FIGS. 1 to 4. The reason for using this alternative is that the method of compositing to the temporary buffer requires extra decisions and operations. Such additional operations may only be justified for rendering a particular portion of a page, whereas the simpler procedure of FIG. 1 may be more efficient for the remainder of the page.

In the alternative arrangement, the rendering steps 169 and 171 are modified, such that depending on the required compositing bit depths of objects between AOL[0] and AOL[i], either steps 169 and 171 of are performed as shown in FIG. 1, or, the modified steps 169 and 171 are performed repeatedly for each compositing operation.

6.0 Implementation

The present specification discloses apparatus for performing the operations of the methods. Such apparatus may be specially constructed for the required purposes, or may comprise a general purpose computer or other device selectively activated or reconfigured by a computer program stored in the computer. The algorithms and displays presented herein are not inherently related to any particular computer or other apparatus. Various general purpose machines may be used with programs in accordance with the teachings herein. Alternatively, the construction of more specialized apparatus to perform the required method steps may be appropriate.

In addition, the present invention also implicitly discloses a computer program, in that it would be apparent to the person skilled in the art that the individual steps of the preferred method described herein are to be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing the spirit or scope of the invention. Furthermore one or more of the steps of the computer program may be performed in parallel rather than sequentially.

Such a computer program may be stored on any computer readable medium. The computer readable medium may include storage devices such as magnetic or optical disks, memory chips, or other storage devices suitable for interfacing with a general purpose computer. The computer readable medium may also include a hard-wired medium such as exemplified in the Internet system, or wireless medium such as exemplified in the GSM mobile telephone system. The computer program when loaded and executed on such a general-purpose computer effectively results in an apparatus that implements the steps of the preferred method.

Where reference is made in any one or more of the accompanying drawings to steps and/or features, which have the same reference numerals, those steps and/or features have for the purposes of this description the same function(s) or operation(s), unless the contrary intention appears.

The principles of the preferred method described herein have general applicability to renderers. However, for ease of explanation, the steps of the preferred method are described with reference to a software implementation. However, it is not intended that the present invention be limited to the described method. For example, the invention may have application to renderers implemented in hardware.

INDUSTRIAL APPLICABILITY

It is apparent from the above that the arrangements described are applicable to the computer and data processing industries. The described arrangements provide the accuracy benefits of rendering in a higher bit depth, while maintaining or nearly maintaining the speed of a lower bit depth renderer.

The foregoing describes only some embodiments of the present invention, and modifications and/or changes can be made thereto without departing from the scope and spirit of the invention, the embodiments being illustrative and not restrictive.

The claims defining the invention are as follows:

1. A method of compositing a plurality of graphical objects to create an image comprising a plurality of parts, at least one of the graphical objects having a semi-transparent fill color, said method comprising the steps of, for each part of the image to be composited:
    identifying a set of the graphical objects that contribute to the part, at least one of the graphical objects of said set having a semi-transparent fill color;
    determining one or more required bit depths for compositing said set by examining each object in said set to determine a bit depth required to composite the object in consideration of properties of the examined objects selected from the group consisting of:
    fill type;
    fill opacity; and
    fill color space; and
    compositing said set of identified graphical objects within the part of the one or more required bit depths.

2. A method according to claim 1, further comprising the step of:
    converting a result of said compositing step to an output bit depth.

3. A method according to claim 2, wherein said converting step comprises halftoning.

4. A method according to claim 1, wherein the fill type is at least one of:
    a gradient fill; and
    a bitmap fill needing interpolation.

5. A method according to claim 4, wherein at least one of the graphical objects is stored at a first bit depth and the method further comprises the step of:
    converting the at least one graphical object from the first bit depth to the minimum bit depth required to composite the object prior to said compositing.

6. A method according to claim 4, wherein said step of determining one or more required bit depths further comprises the sub-step of:
    selecting, as the required bit depth for the set of graphical objects, a highest minimum bit depth for the set.

7. A method according to claim 4, wherein said examining sub-step is only performed once per object and the determined minimum bit depth is stored for use in compositing remaining parts of the image.

8. A method according to claim 4, wherein the minimum bit depth is dependent on a predetermined output bit depth.

9. A method according to claim 1, comprising the further step of, for each part of the image:
    outputting a result of the compositing step together with associated data indicating a bit depth of the result for the part.

10. A method according to claim 1, wherein each part comprises a run of one or more pixels along a scanline, and wherein each scanline is divided into one or more runs such that the same set of graphical objects contributes to each pixel in the run.

11. A method according to claim 1, wherein each part is a region of the image, and wherein the set of contributing objects does not change over the region.

12. A method according to claim 1, wherein each part is a region of the image occupied by a corresponding object.

13. A method according to claim 12, wherein said compositing step for a region composites the corresponding object onto a framestore containing a result of compositing any previously composited objects in the region.

14. A method according to claim 13, wherein said step of determining one or more required bit depths for compositing refers to secondary data comprising bit depths at which the previously composited objects in the region were composited.

15. A method according to claim 14, wherein the required bit depth for compositing the region is the highest of:
    the bit depths at which the previously composited objects in the region were composited; and
    a minimum bit depth required to composite the corresponding object occupying the region.

16. A method according to claim 15, wherein said secondary data for the region is updated with the required bit depth.

17. A method according to claim 1, wherein two or more compositing operations are required to composite the set of graphical objects, and wherein said determining step determines a required bit depth for each compositing operation.

18. A method according to claim 17, wherein said compositing step performs each compositing operation at the corresponding required bit depth.

19. A method according to claim 1, wherein said compositing takes into account said semi-transparent fill color for at least one said part of the image.

20. A method according to claim 1, wherein at least one compositing operation used to create the image is a Porter and Duff compositing operation.

21. An apparatus for compositing a plurality of graphical objects to create an image comprising a plurality of parts, at least one of the graphical objects having a semi-transparent fill color, said apparatus comprising:
means for identifying, for each part of the image to be composited, a set of the graphical objects that contribute to the art at least one of the graphical objects of said set having a semi-transparent fill color;
means for determining, for each part of the image to be composited, one or more required bit depths for compositing said set by examining each object in said set to determine a bit depth required to composite the object in consideration of properties of the examined objects selected from the group consisting of:
fill type;
fill opacity; and
fill color space; and
means for compositing said set of identified graphical objects within the part at the one or more required bit depths.

22. A system for compositing a plurality of graphical objects to create an image comprising a plurality of parts, at least one of the graphical objects having a semi-transparent fill color, said system comprising:
data storage for storing the plurality of graphical objects; and
a renderer in communication with the data storage and adapted to:
identify, for each part of the image to be composited, a set of the graphical objects that contribute to the part, at least one of the graphical objects of said set having a semi-transparent fill color;
determine, for each part of the image to be composited, one or more required bit depths for compositing said set by examining each object in said set to determine a bit depth required to composite the object in consideration of properties of the examined objects selected from the group consisting of fill type:
fill opacity; and
fill color space; and
composite said set of identified graphical objects within the part at the one or more required bit depths.

23. A computer readable medium encoded with a computer program for controlling the operation of a data processing apparatus on which the program code executes to perform a method of compositing a plurality of graphical objects to create an image comprising a plurality of parts, at least one of the graphical objects having a semi-transparent fill color, said method comprising the steps of, for each part of the image to be composited:
identifying a set of the graphical objects that contribute to the part, at least one of the graphical objects of said set having a semi-transparent fill color;
determining one or more required bit depths for compositing said set by examining each object in said set to determine a bit depth required to composite the object in consideration of properties of the examined objects selected from the group consisting of:
fill type;
fill opacity; and
fill color space; and
compositing said set of identified graphical objects within the part at the one or more required bit depths.

* * * * *